United States Patent [19]

Maynard

[11] Patent Number: 4,776,541
[45] Date of Patent: Oct. 11, 1988

[54] FLUIDIC MOMENTUM CONTROLLER

[75] Inventor: Ronald S. Maynard, Houston, Tex.

[73] Assignee: The United States of America as represented by the Administrator of the National Aeronautics and Space Administration, Washington, D.C.

[21] Appl. No.: 21,569

[22] Filed: Feb. 27, 1987

Related U.S. Application Data

[63] Continuation of Ser. No. 779,742, Sep. 24, 1985, abandoned.

[51] Int. Cl.$^4$ ................................................ B64G 1/28
[52] U.S. Cl. ..................................... 244/165; 74/572; 244/164
[58] Field of Search ................... 244/159 R, 159, 164, 244/165; 74/572, 573; 114/124, 125, 333

[56] References Cited

U.S. PATENT DOCUMENTS

| | | | |
|---|---|---|---|
| 2,856,142 | 10/1958 | Haviland | 114/125 |
| 3,733,923 | 5/1973 | Goodrich et al. | 74/573 |
| 3,862,732 | 1/1975 | Wyatt et al. | 244/165 |
| 3,915,416 | 10/1975 | Anderson et al. | 244/165 |
| 4,193,570 | 3/1980 | Hoffman et al. | 244/165 |
| 4,212,443 | 7/1980 | Duncan et al. | 244/177 |
| 4,230,294 | 10/1980 | Pistiner | 244/164 |
| 4,288,051 | 9/1981 | Göschell | 244/164 |
| 4,504,033 | 3/1985 | Engelking | 244/170 |
| 4,579,302 | 4/1986 | Schneider et al. | 244/159 |

*Primary Examiner*—Galen L. Barefoot
*Attorney, Agent, or Firm*—Russell E. Schlorff; John R. Manning; Edward K. Fein

[57] ABSTRACT

Large angular control moments and torques are developed by controllably circulating a relatively small mass of liquid (22) through small diameter pipes (20) describing a large diameter loop (15*f,a,b*). The loop (15), by thus generating and storing angular momentum, can thereby provide efficient cancellation of periodic, non-accumulating, externally induced rotational disturbances. The loop (15) is preferably located on or near the periphery of a structure (10) which is to be thus stabilized.

6 Claims, 4 Drawing Sheets

FLUIDIC MOMENTUM CONTROLLER

ORIGIN OF THE INVENTION

The invention described herein was made by an employee of the United States Government and may be manufactured and used by or for the Government of the United States of America for governmental purposes without the payment of any royalties thereon or therefor.

This application is a continuation of application Ser. No. 779,742 filed 9/24/85 abandoned.

BACKGROUND OF THE INVENTION

The present invention relates to the stabilization and control of large bodies, and more particularly to the efficient neutralization and damping of externally or internally originating periodic, non-accumulating torques to which such a body may be subjected. Such systems are in wide use today, ranging from control systems for ocean-going ships to stabilization systems for earth-orbiting satellites. Thus, while the present invention will be particularly described with respect to space stations, satellites, etc., it will be understood that the invention has perhaps even greater utility in terrestrial applications.

The successful operation of future space stations, platforms, or vehicles requires that they be capable of controlling and maintaining a desired orbital flight attitude (e.g., a solar inertial attitude). Large structures in low earth orbit, if not uniformly balanced, are particularly susceptible to gravity gradient disturbance torques and to aerodynamic torques on one or more axes. In the general case, the three principal axes of inertia will not be of equal magnitude. A space station orbiting with one of its principle axes in the orbit plane will produce cyclic, nonaccumulating torques about the two out-of-plane axes, and will produce a biased, accumulating torque about the third axis lying in the orbit plane. These constant disturbance torques will act on a structure and cause its total angular momentum to fluctuate accordingly. The major, periodic constituent of this variation may have, in the case of a typical space station configuration, an amplitude in the range of 15,000 to 90,000 ft-lb-s. The magnitude of angular momentum buildup, of course, will depend upon the degree of station imbalance.

If a particular attitude, such as a solar inertial attitude, is to be maintained, appropriate torques must be applied about each axis to null the gravitationally and aerodynamically induced torques. Unlike the cyclic disturbances, any biased torques that exist will produce an angular momentum buildup necessitating repeated desaturation (such as with attitude control jets, magnetic torquers, or a similar system).

Angular momentum management and attitude control of a small space vehicles has been reliably provided by control moment gyros and reaction wheels. These devices operate on the gyroscopic principles of spinning rotors, and are capable of producing control torques and storing angular momentum. A reaction wheel produces torque and stores angular momentum by commanding a change in rotor speed about a fixed spin axis. Control moment gyros and double gimbaled control moment gyros operate by attempting to rotate a constant speed rotor about a given axis, resulting in a torque which is perpendicular to both axes. When momentum saturation occurs, no further torquing may be obtained in the direction of saturation. In general, both these devices have storage capabilities of about 6.0 ft-lb-s/lb of flywheel, and operational energy requirements in the neighborhood of 50 watts/1000 ft-lb-s. Advancements in material technology may produce composite flywheels with slightly greater capabilities, but unfortunately, problems with creep and material integrity reduce the advantages of composites.

Other system problems are of greater concern, however. A space station class vehicle, ocean-going ship, etc., will have large momentum control requirements necessitating the use of many control moment gyros or reaction wheels. Each unit will ordinarily require individual control and will occupy useful structure area which might otherwise be used for more constructive purposes. Furthermore, a nominal system reliability will require either a very high unit reliability or the installation of additional backup units.

Of perhaps even greater concern are the safety issues concerning rotor rupture confinement. High speed rupture of these devices could cause substantial damage to the surrounding structure, and jeopardize crew safety. Stringent safety requirements can therefore be expected to cause system weights to increase substantially.

For small to moderate torquing requirements, electromagnetic torquebars have been successfully used for complete, three axis angular momentum control. A torquebar's energy efficiency and system weight, however, severely restrict its use for all by small amplitude desaturation torquing.

To summarize, control moment gyros, magnetic torquers, and reaction wheels exhibit poor energy efficiencies and, when reliability and safety issues are properly addressed, inflict large weight penalties.

A need therefore remains for an efficient, light weight, reliable, and versatile momentum control method and apparatus which can better meet the cyclic and periodic torquing and momentum compensation and management needs of an extended body, such as a space station, ocean-going ship, and so forth. The method and apparatus should preferably use less energy and be lighter in weight than prior art devices.

SUMMARY OF THE INVENTION

Briefly, the present invention meets the above needs and purposes with a fluidic momentum controller which enables a body, such as a space station, to be controlled and maintained in any desired stable attitude. The present invention resists and counterbalances externally applied disturbance torques such as those produced by aerodynamic and gravity gradients.

As described earlier, an extended body, such as a space station, will remain in a fixed position or at a fixed rate only if for every disturbing torque there is an equal and opposite restoring torque. The fluidic momentum controller of the present invention generates this attitude controlling torque with improved power and weight efficiency over conventional devices. The present invention also has the capability to store large amounts of angular momentum, which can accumulate when a torque is consistently applied to a body over an extended period of time. The installation of the present invention about the periphery of three different sides of such a space station will provide fast response time, three axis control of the structure. In addition, a fluidic momentum control system according to the present invention can also be utilized as a station balancing and waste heat management/rejection device.

In a preferred embodiment, the present invention includes several (preferably at least three) fluid loops. Each loop preferably lies in substantially a single plane, and the plane(s) is(are) selected, as is well understood in the art, according to the number of axes around which control torques and momentum management must be provided. In the preferred embodiment, each loop is attached to substantially the periphery of the body whose angular momentum is being controlled.

The loops each consist of a substantially continuous loop of pipe. Each loop of pipe is substantially filled with a liquid, and the liquid is reversibly pumped through the loop to generate the control torques and momentum as needed. The amount of momentum to be generated may be determined by any suitable attitude and/or motion sensing and supervising device as is well known in the art.

The preferred embodiment of the present invention also provides for adjusting the overall mass distribution of the system, and thus of the extended body to which the fluidic momentum control system is attached. This is done, for instance, with one or more variable capacity fluid reservoirs in communication with the fluid loop. By increasing or decreasing the amount of fluid in the reservoir(s), the overall total mass distribution can be adjusted. Mass imbalances can therefore be reduced or eliminated, thereby significantly reducing the amount of angular momentum compensation which must be provided.

Since the present invention propels fluid through an extended circuit on the vehicle or other system or body being controlled, the fluid can be employed as a transport medium as well. In a preferred embodiment, therefore, heat is also carried from sources to sinks by the fluid loop, thereby efficiently accomplishing several desireable functions with little additional equipment.

It is therefore an object of the present invention to provide a method and apparatus for stabilizing bodies and structures which are subject to periodic disturbance torques; such a method and apparatus which can develop large angular control moments and torques as needed; which includes a fluid loop, control means for determining the amount of angular momentum to be generated by the fluid loop, and means responsive to the control means for propelling fluid through the loop to generate that amount of angular momentum; in which the fluid loop may be attached to substantially the periphery of such a body for controlling the angular momentum thereof; which thus can provide a large area fluid loop utilized as an angular momentum controller; in which the loop may be a substantially continuous, liquid filled loop of pipe lying substantially in a single plane; which may include a reversible pump or pump circuit for reversibly pumping such a liquid through the loop; which may also include mass distribution means such as one or more variable capacity fluid reservoirs in communication with the fluid loop; which can accordingly incorporate a fluid balasting system; which may be further employed as a transport system, such as for transporting heat; which can thus include a thermal management system; and to accomplish the above objects and purposes in an inexpensive, uncomplicated, durable, versatile, and reliable method and apparatus, inexpensive to manufacture, and readily suited to the widest possible utilization in stabilizing structures subject to periodic disturbance torques.

These and other objects and advantages of the invention will be apparent from the following description, the accompanying drawings, and the appended claims.

DESCRIPTION OF THE PREFERRED EMBODIMENTS

Figure 1:
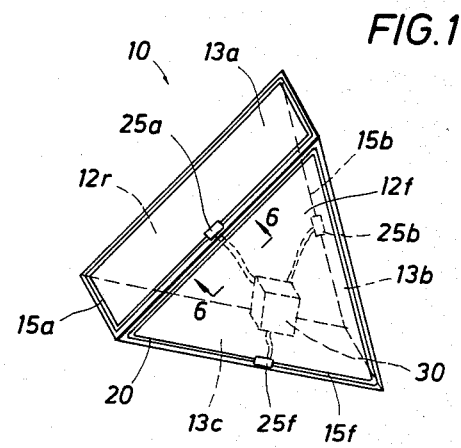
FIG. 1 is a somewhat figurative schematic illustration showing an extended structure or body to which a fluidic momentum controller system according to the present invention has been attached.
Figure 2:
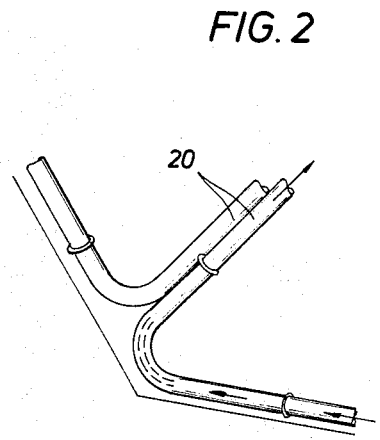
FIG. 2 is an enlarged fragmentary illustration showing the preferred corner pipe configuration of a fluid loop.
Figure 3:
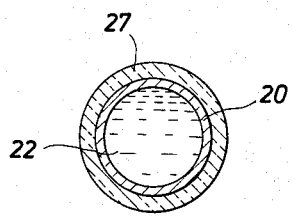
FIG. 3 is a cross-sectional view of a fluid conducting pipe having a micrometeorite bumper and thermal insulation.

With reference to the drawings, the new and improved fluidic momentum controller and the method therefor according to the present invention will be described. FIG. 1 shows, in a very diagrammatic way, an extended structure 10, such as a Delta Space Station, as more fully disclosed in United States patent application Ser. No. 587,764, filed Mar. 9, 1984 for "Shuttle Launch Triangular Space Station", now U.S. Pat. No. 4,579,302 and fully incorporated herein by reference. Station 10 has front and rear triangular faces 12f and 12r, respectively, and rectangular side faces 13a, 13b, and 13c. Around the periphery of at least three non-parallel faces, such as faces 12f, 13a, and 13b, are three respective, independent, planar fluidic loops 15f, 15a, and 15b. Each of the loops consists of a substantially planar loop of small diameter pipe 20, fluid 22 substantially filling each pipe 20, and a corresponding fluid impeller 25, such as a reversible pump. The conduit or pipe 20, if used in a space application, may be an insulated, thin walled pipe surrounded by micrometeorite shielding 27, as shown in FIG. 3. The pipe 20 should be capable of containing the fluid pressure with minimum leakage.

Figure 1A:
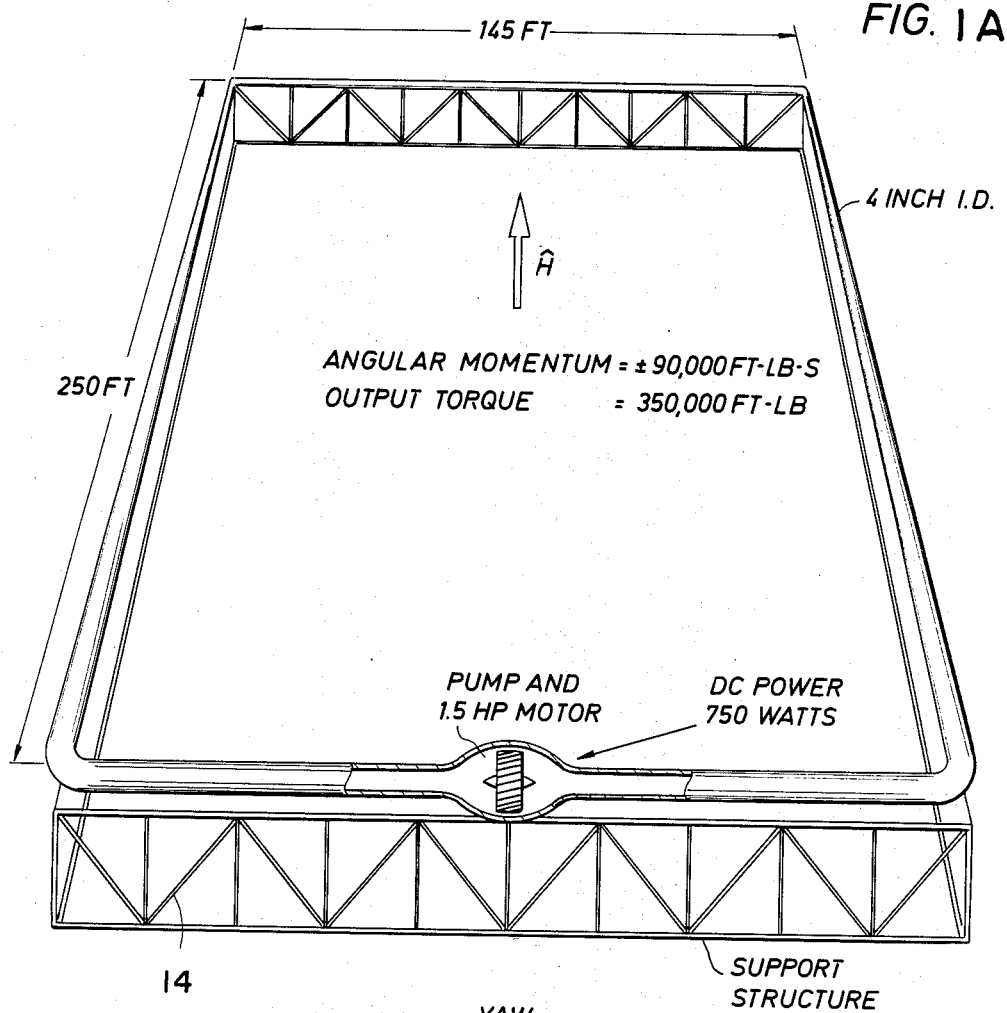
FIG. 1A illustrates a single plane fluid loop such as may be attached to one face of a large space structure.

FIG. 1A illustrates a single fluid loop attached to a large planar structure such as a face of a large space structure 14. The pump shown in a submersible turbine housed in an enlarged cross-sectional area which effectively reduces operational flow velocity (e.g., from around 10 fps to just a few fps), resulting in a significant improvement in pump efficiency and a reduction in vibrations produced by turbulent fluid flow. Dimensions and performance characteristics shown are typical for one face of the proposed Delta Space Station referred to above.

The torques developed by the loops 15$f$, 15$a$, and 15$b$ will be determined by the rates of acceleration and deceleration of the fluids 22 in them, and the angular momentum stored in the loops will be determined by the fluid velocities in the loops at any given moment. Control of the accelerations and net velocities rests with a controller 30 which controls the operation of the pumps 25. As will be understood by those skilled in the art upon reading the present specification, controller 30 may be any suitable, known stabilization controller, as is well known in the art, connected to control the pumps 25 according to such predetermined pumping/torque/-momentum relationships as will be further developed below.

The fluidic momentum controller system is thus composed of four basic components: (1) the fluid carrying conduit 20 attached to the periphery of the structure 10, (2) the fluid 22, (3) pumps 25 to accelerate and maintain the velocity of the fluid 22, and (4) a combination of motion sensors and computing hardware 30 to control the system.

When control torque is required, the pump 25 is instructed to accelerate the fluid 22 within the pipe 20. As the fluid's velocity increases, so too does its angular momentum. The accelerating process can be viewed as a torque which acts on the fluid loop 15 over an extended period of time, resulting in the accumulation of angular momentum. However, total angular momentum of the station 10 and loop 15 must be conserved. Thus, the fluid loop 15 must impart an equal and opposite torque to the station. The ultimate goal, of course, is to produce enough torque to precisely cancel all external disturbances, thereby permitting the station to remain inertially fixed. As suggested above, for a structure such as that illustrated in FIG. 1, three fluid loops located on different, non-parallel faces of the station would be sufficient to provide three axis attitude control.

In the preferred embodiment, electric pumps perform the task of accelerating and maintaining the velocity of the fluid. Even with large control demands, a typical space platform motor size is expected to be in only the ½ to 2 hp range. (Reliability concerns, of course, may require double or triple redundancy of these devices.) The pumps could be of reversible or nonreversible flow design. A typical control routine demands reversible, variable flow for each of the loops. It is possible that a reversible, variable speed pump might satisfy both requirements in a strightforward fashion. However, unidirectional pumps are usually more efficient, and could accommodate the requirements with a valving system such as shown in FIG. 6.

Figure 6:
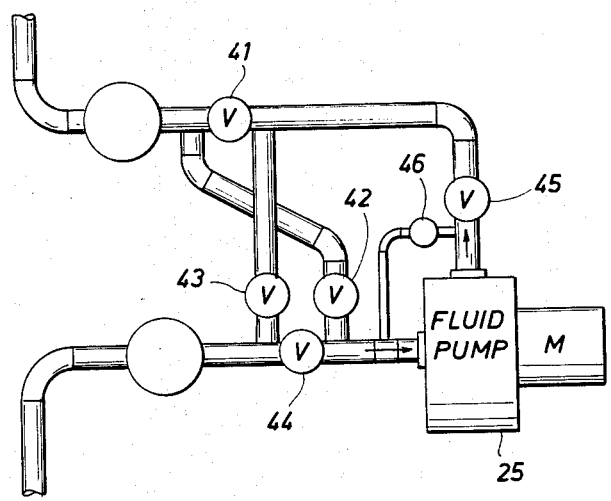
FIG. 6 illustrates a valving system which could be used with a unidirectional pump for reversibly pumping the fluid through the loop.

Referring to FIG. 6, valves 41, 42, 43, and 44 are on/off valves. Valve 45 is a modulating valve. Valve 46 is a bypass valve. Thus, for flow in one direction, valves 41 and 44 will be open, and valves 42 and 43 will be closed. For reversed flow through the loop, valves 41 and 44 will be closed, and valves 42 and 43 will be open. In both cases, valves 45 and 46, which are optional, can be used to modulate or reduce the net flow through the loop.

Two variable speed, back-to-back or face-toface single direction pumps would also satisfy these requirements. While one was actively engages, the other impeller would passively free-spin. Reversing the roles would reverse the flow direction. This method would take advantage of the high efficiency, single direction flow impeller.

Additional pumping methods include an induction coil acting on a slurry of magnetic particles, thereby avoiding the use of an impeller while allowing for variations in speed and flow direction.

Controller 30 may consist of an instrumentation package having angular motion sensors and accelerometers for providing feedback data to computers for controlling the fluid loops. Thermocouples and pressure transducers may also be included to monitor fluid temperatures and pressures so that nominal conditions can be maintained.

Operation of the fluidic momentum controller is relatively simple. Consider a solar inertial case in which a space station 10 must remain fixed with respect to the sun. In this case, the requirements represent the integrated effects of gravity gradient and aerodynamic disturbance forces. As disturbance torques begin to alter the station's attitude, motion sensors in controller 30 detect these deviations. The computers then process this information, using control algorithms which incorporate preprogrammed inertial properties of the station 10, and which then calculate the amount of corrective torquing which each loop must provide the realign the station.

Suppose the computer has decided that loop 15$a$ must increase its output torque. A command is given to pump 25$a$ to accelerate the fluid to a higher velocity, thereby producing torque and storing additional angular momentum.

A fluidic momentum controller can advantageously perform other functions in addition to providing the control torques and angular momentum storage necessary for nulling disturbance torques and holding a structure's attitude. Such additional services include the collection and removal of waste heat from on-board systems, and fluid ballasting.

Figure 7:
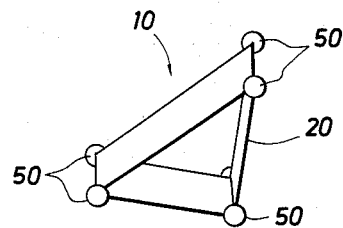
FIG. 7 is a figurative, schematic illustration of ballasting tanks added to a structure or body similar to that shown in FIG. 1.

Fluid ballasting can be provided, for example, by strategically placed fluid reservoirs 50 (FIGS. 7 and 8) located along the edge of a station and on or near a main line. Fluids are then pumped into and out of various tanks 50 to favorably alter the station's mass distribution properties. The resulting improvement will reduce gravity gradient disturbance torques, thereby making attitude control easier to achieve.

Figure 4:
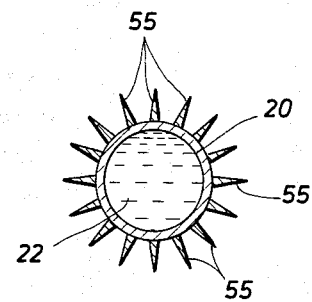
FIG. 4 is a cross-sectional view of a fluid conducting pipe having heat radiating fins attached to the outer surface thereof.
Figure 5:
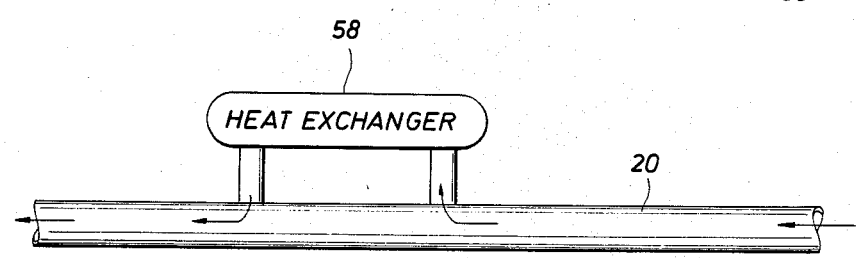
FIG. 5 illustrates connection of a heat exchanger to the fluid loop.

A fluidic momentum controller according to the present invention is also ideally suited for absorbing large quantities of waste heat from on-board systems, due to the sizable volumes of liquid that flow through the system conduits 20 circumscribing the host structure 10. By attaching radiating fins 55 (FIG. 4) to these long spans of pipe, a sufficiently large radiating surface area can be made available for typical space station operations. Fluid can be tapped from the main line 20 (FIG. 5), circulated through a module's heat exchanger 58, and then injected back into the line 20, providing an effective heat sink for virtually any on-board system. Once the fluidic momentum controller's working fluid has absorbed waste heat, it is then radiated into open space through the walls of the pipe 20 and from the surfaces of the radiating fins 55. If this waste heat management option is used, then the conduit 20 should be highly thermally conductive and should preferably be fitted with radiating fins such as fins 55. These fins also provide added micrometeorite protection.

The fluid 22 may be a common substance such as water, which could also be used for crew consumption as well as for momentum storage, or it may be a specialized fluid which minimizes frictional power losses while maximizing heat transfer. If heat rejection is not incorporated into the system, then depending upon the application, the fluid may need to possess a low freezing point and a low partial pressure to prevent cavitation bubbles from disrupting pumping operations. Studies have shown that power and weight parameters improve with decreasing fluid densities and dynamic viscosities. Thus, water or lighter fluids would probably be preferable to liquid metals. Also, in zero G, it may be possible in certain applications to mix dissimilar fluids, such as mercury and water, so that their most desirable properties complement one another. The result might be a fluid which exhibits low friction losses at a high mass flow rate.

Figure 8:
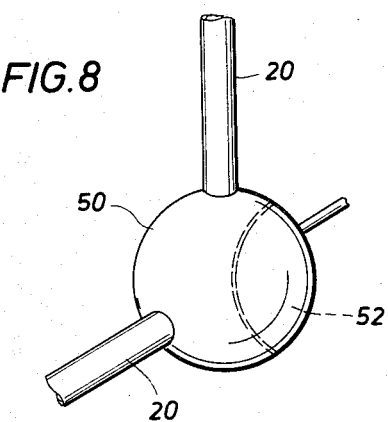
FIG. 8 is an enlarged illustration of a ballasting tank such as that shown in FIG. 7.

Space station gravity gradient disturbances arise from the fact that the moments of inertia differ for each axis. Additional imbalances occur during Shuttle berthing operations. Placing ballast tanks such as the fluid reservoirs 50 in the fluid loop, as indicated above, will provide for better balancing, ultimately resulting in reduced momentum storage requirements. Ballast tank fluid levels and operational line pressures can be controlled, for example, with air pressure and internal bladders 52, as shown in FIG. 8.

A fluidic momentum controller system has many performance factors which are superior to a conventional control moment gyro, reaction wheel, or torque bar system. Perhaps the most attractive aspect is the ability of a small fluidic momentum controller loop to produce extremely high output torques at a fraction of the power expenditure and vibration levels experienced by a comparable control moment gyro system. For the same reasons, a fluidic momentum controller would be the preferred actuator for a rapid pointing platform.

The angular momentum storage capability per pound of device is much greater for a fluidic momentum controller. This is important for large structures, such as LEO space stations, which incur sizable aerodynamic and gravity gradient disturbances. Furthermore, a control moment gyro system must operate within a sharply defined envelope, whereas a fluidic momentum controller can continue to produce torque and store angular momentum by simply increasing the power to the pump 25 or by placing an additional pump in series with it.

Since the fluidic momentum controller has only one moving part—the pump—its reliability will be significantly better than its complicated control moment gyro counterpart. Changing out a one or two horsepower pump unit should prove far less difficult than replacing a massive, vibration isolated, 48" sphere containing a control moment gyro unit.

The catastrophic failure of a control moment gyro might very well be a damaging and perhaps life-threatening event, whereas a leaking, low pressure fluidic momentum controller joint or faulty pump would not. Since the burden of increasing reliability and providing safety measures is proportional to the safety risks, a fluidic momentum controller system can be expected to be less costly and less difficult to develop and maintain.

The operating principles of a fluidic momentum controller are quite similar to those of a conventional control moment gyro or reaction wheel system. The circulation of fluid provides torque and momentum storage in much the same way that a flywheel does. However, instead of storing angular momentum in a high speed, small radius rotor, it is stored in a low circulation velocity, large diameter fluid loop. Thus a smaller, slower-moving mass at a much longer moment arm is used rather than a lighter, very rapidly moving mass on a very short moment arm.

Figure 9:
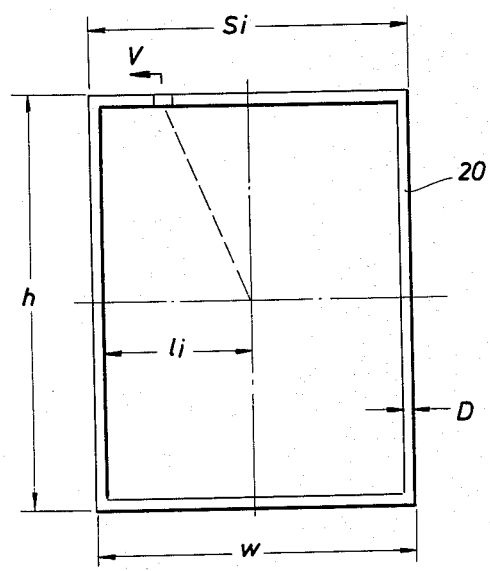
FIG. 9 is a schematic drawing of a rectangular fluid loop for analyzing the dynamics and properties thereof.

To analyze the fluid loop in greater detail, consider that the angular momentum of a fluid mass traveling in a rectangular path may be determined by summing the contribution of each side. The contribution of each side is simply the linear momentum of that fluid element times the moment arm. Referring then to FIG. 9, for a rectangular loop the angular momentum may be determined as follows, where:

$D$ = Pipe Diameter (in.)
$V$ = Fluid Velocity (ft/s)
$A_{Loop}$ = Area Contained Within a Loop (ft$^2$)
$A_p$ = Cross Section Area of Pipe (ft$^2$)
$\rho$ = Fluid Density (slug/ft$^3$)
$H_o$ = Desired Angular Momentum (ft-lbs-s)
$l_i$ = Moment Arm to One Segment (ft)
$S_i$ = Length of One Pipe Segment (ft)
$w$ = Width of Rectangle (ft)
$h$ = Height of Rectangle (ft)
$M_i$ = Fluid Mass in One Pipe Segment (slugs)

Then:

$$\begin{aligned}(1)\quad H_o &= \sum_{i=1}^{4} l_i M_i V \\ &= \sum_{i=1}^{4} l_i (A_p S_i \rho) V \\ &= 4(l_i S_i) A_p \rho V \\ &= 4(\tfrac{1}{4} wh) A_p \rho V \\ &= 4(\tfrac{1}{4} wh)\pi \left(\frac{D}{24}\right)^2 \rho V \\ &= 4(\tfrac{1}{4} A_{Loop})\pi \left(\frac{D}{24}\right)^2 \rho V \\ &= \frac{V\pi}{288} A_{Loop} \rho D^2 \quad \text{(ft-lb-s)}\end{aligned}$$

An interesting result of this study is that the angular momentum storage capability of a fluid loop is independent of its shape. It is simply proportional to the enclosed area of the loop, the fluid velocity, fluid density, and the square of the pipe diameter.

As may be seen, therefore, the present invention has numerous advantages. It provides an efficient, light weight, reliable, and versatile momentum control method and apparatus which can better meet the cyclic and periodic momentum compensation and management needs of an extended body, such as a space station, ocean-going ship, and so forth, than such prior art devices as control moment gyros and reaction wheel systems.

The fluidic momentum controller will thus enable future space stations to better resist disturbance torques, and in so doing, provide more effective flight attitude control. The same benefits will obtain for many terrestrial applications, such as stabilizing ocean-going ships. The invention will provide these results with less weight and less power consumption than conventional attitude maneuvering equipment. Its additional capabilities, which include station ballasting and thermal management, make it an even more valuable and desirable device for such uses.

The advantages of moving from high speed rotor type devices to a fluidic momentum controller system are numerous. First, performance capabilities such as high output torque, high energy efficiency, and low system mass, exceed by a large margin those of conventional control moment gyros and reaction wheels. Secondly, due to the inherent simplicity of the system, reliability of the fluidic momentum controller can be very high. In contrast, the complexity of a multi-unit control moment gyro system tends to increase the development lead times, cost of fabrication, and system mass necessary to achieve an acceptable reliability. To some extent, safety issues dictate control moment gyro reliability concerns. High speed rotors store a great deal of rotational energy and operate in a state of high energy density. If a rotor failure occurs, either by loss of bearing containment or catastrophic fragmentation, the control moment gyro shroud can be breached. The resulting escape of high speed projectile(s) can pose a significant hazard to other control moment gyros, the surrounding structure, and nearby personnel. The fluidic momentum controller, on the other hand, operates at a low energy density level, thereby avoiding most of the risks associated with high energy density operation.

A control moment gyro system requires mounting on a vibration isolation platform, and occupies valuable area on the structure being stabilized. The fluidic momentum controller, on the other hand, is located at the periphery of the structure, and due to its low operational velocity, transmits little or no vibrations to the structure.

The fluidic momentum controller's secondary functions are perhaps just as valuable as its primary task of attitude control. During normal operation, large amounts of fluid flow about the periphery of the structure. A fluid such as water possesses a high heat capacity which allows it to absorb heat energy readily. A module located anywhere along the fluid loop may tap into the line and expel its waste heat into the fluid through a heat exchanger. Attaching radiating fins to the pipes then permits rejection of this waste heat into the surrounding environment. Thus, the fluidic momentum controller can also act as a heat sink/heat management system. A space station's need for large radiator panels can be reduced or eliminated since the long lengths of pipe in the fluidic momentum controller will provide very large radiating surface areas for these heat rejection requirements.

In addition, a fluidic momentum controller system can perform the useful task of controlling fluid levels within various reservoirs located along the lines. Independently varying a holding tank's fluid level at the expense of another is equivalent to shifting large masses from one part of the station to another. In this way, the spatial distribution of the fluid mass can be adjusted to optimize the station balance. This is very desirable since a more evenly balance station will result in reduced momentum storage demands, thereby making the fluidic momentum controller's primary task less difficult.

With this discussion, it will now be seen that other uses and applications for the invention, and other methods for pumping fluid (such as electric/magnetic, peristaltic, and magnetic slurry pumping), are within the scope of the present invention.

Figure 10:
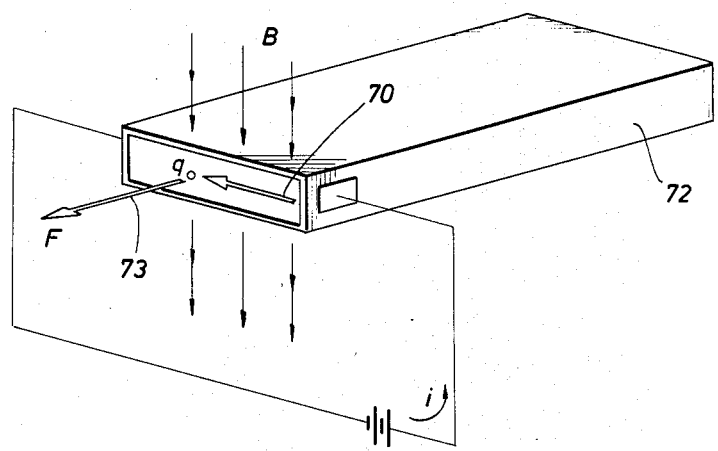
FIG. 10 is a schematic drawing illustrating electric/magnetic pumping of the fluid.

FIG. 10 illustrates the principles of electric/magnetic pumping. As an electric current 70 is passed through a conducting liquid 72 such as mercury, the charge carriers experience a magnetic deflecting force 73 according to the relationship $F=qv \times B$. The field geometries of FIG. 10 dictate that the resulting cross product force is directed along the pipe, thereby producing the desired pumping action.

Magnetic pumping can be produced by creating a traveling magnetic field which carries along with it a slurry of magnetic particles immersed within the fluid to be pumped.

Figure 11:
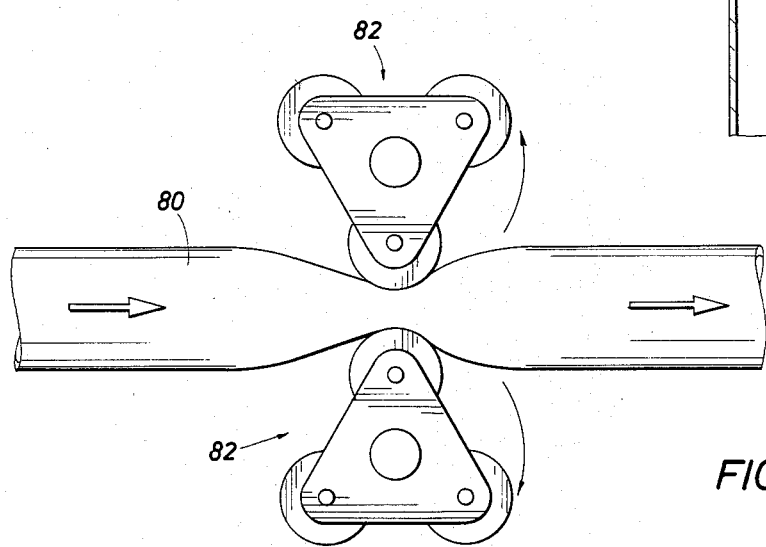
FIG. 11 is a schematic drawing illustrating peristaltic pumping of the fluid.

Peristaltic pumping can be produced with the flexible tubing 80 and roller assembly 82 illustrated in FIG. 11. Very precise, low velocity flow rates may be achieved with this method. A smaller fluid loop using peristaltic pumping could, when used in conjuction with a large capacity loop, provide a dead band pointing capability of essentially any desired tolerance by controlling the total angular momentum to within fractions of a ft-lb-s.

Figure 13:
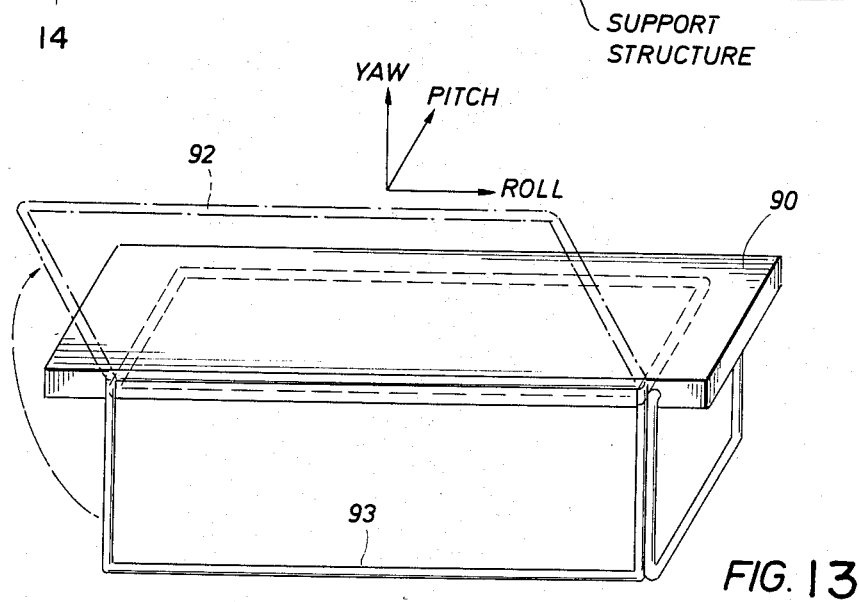
FIG. 13 is a schematic drawing illustrating stabilization of a large floating platform or vessel.

Stabilization of a large floating platform or vessel 90 could be accomplished with a fluidic momentum controller system (see FIG. 13). For example, a single loop of dimensions 90'×200'×16" could develop the following control performance:

| | |
|---|---|
| Angular Momentum = | 1,000,000 ft-lb-s |
| Control Torque = | 1,000,000 ft-lb @ 80 psi |
| Fluid Friction Losses = | 10.7 hp |

Pipes could be constructed of common plastic materials so that their empty weight in a stowed configuration 92 would be low. In the submerged or operational mode 93 (see FIG. 13), pipe weight would be negligible since the specific gravity of plastics is close to 1.0. With three of these loops and their driving pumps attached to a rigid platform, all three axes, roll, pitch, and yaw, can be controlled and provide a high degree of angular stability. Such a platform might be useful for offshore stellar observations, oceanographic studies, or could be used as a stable offshore landing strip for long range aircraft.

The fluidic momentum controller might also prove useful as an active controller for large buildings during an earthquake. Applying a large control moment to a deflecting structure can help reduce bending loads and perhaps avoid major structural damage. Batteries could supply pump power demands for the few required minutes, thereby eliminating reliance for operation upon the civil power grid.

The use of exotic fluids such as helium II might prove useful for fluidic momentum controller use. Theoretically, this supercooled cryogenic fluid, called a "superfluid", can pass around and through restrictions without transfer of linear momentum in a full flow condition. Stated simply, fluid frictional losses are strictly zero. Since liquid helium II looses it superfluid characteristics above a few degrees Kelvin, the engineering challenge for a fluidic momentum controller user would be to achieve high speed pumping while maintaining the fluid's cryogenic integrity.

Figure 12:
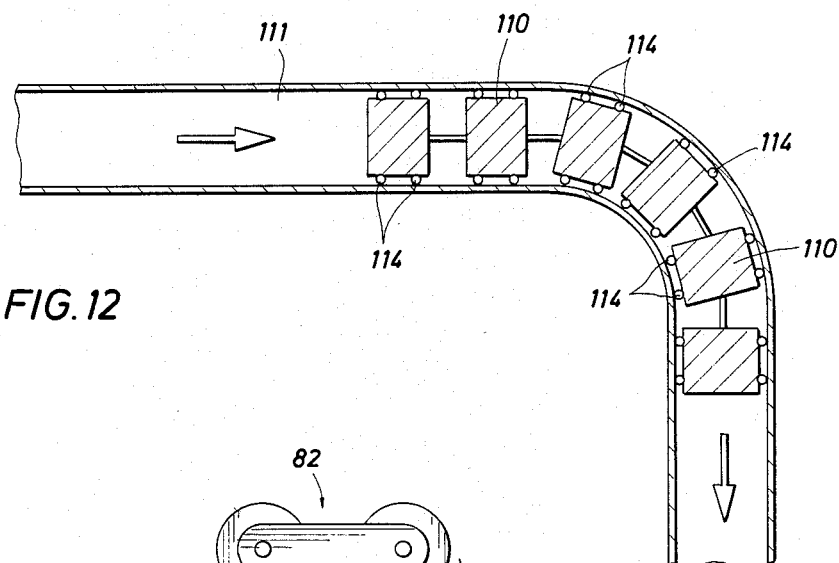
FIG. 12 is a schematic drawing illustrating the use of solid masses in the fluid, or the use of solid masses effectively as a fluid.

Solid slugs of mass 110 (FIG. 12) traveling through a pipe 111 and isolated from the walls via magnetic fields, electrostatic fields, or with mechanical bearings 114 would behave very much like a fluid and would provide angular momentum control in precisely the same way. Therefore, while perhaps not a fluid in the strictest sense, such masses as a whole would behave the same way. Therefore, it is to be understood that the term "fluid" in the present specification fairly includes those configurations of materials which behave essentially as such.

The invention is thus inexpensive, uncomplicated, durable, versatile, reliable, and readily suited to the widest possible utilization in stabilizing structures subject to periodic disturbance torques.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A method for controlling and maintaining in any desired stable attitude a delta shaped space station in low earth orbit, comprising:
    installing three independent, planer, fluidic loops containing fluid having a density and viscosity approximating that of water or less around the periphery of three non-parallel faces of the delta shaped space station;
    providing means responsive to disturbances produced by aerodynamic and gravity gradients of the delta shaped space station for generating signals proportional thereto; and
    providing means in each loop responsive to said signals for propelling said fluid through said loop in a direction and a speed and velocity to generate control torque and momentum counteracting said disturbances.

2. The method specified in claim 1 and including installing fluid reservoirs in communication with the fluidic loop whereby by increasing or decreasing the amount of fluid in the respective reservoirs the overall total mass distribution of the space station can be adjusted.

3. The method specified in claim 2 including attaching radiating fins and sources of heat to the fluidic loop whereby the absorbed heat is radiated into open space during transport of the fluid in the loop.

4. The method specified in claim 1 including attaching radiating fins and sources of heat to the fluidic loop whereby the absorbed heat is radiated into open space during transport of the fluid in the loop.

5. The method specified in claim 1 including providing micrometeorite shielding for the fluidic loops.

6. A space station capable of being maintained in any desired stable attitude in low earth orbit, said station comprising:
    at least one independent, planer, fluidic loop containing fluid having a density and velocity approximating that of water or less attached around a periphery of the space station;
    a plurality of spaced ballast reservoirs in the fluidic loop;
    means responsive to disturbances produced by aerodynamic and gravity gradients for generating signals proportional to such disturbances;
    means to increase or decrease the amount of fluid in respective ballast reservoirs whereby the total mass distribution of the space station can be adjusted; and
    means in said fluidic loop responsive to said signals for propelling said fluid through said loop in a direction and speed and velocity to generate control torque and momentum counteracting said disturbances.

* * * * *